Nov. 11, 1969     H. H. ALBRO     3,477,749
PIPE FITTING HAVING MECHANICAL FASTENER
FOR CONNECTING THE FITTING TO A PIPE
Filed June 13, 1968

INVENTOR
Henry H. Albro

BY W. E. Sherwood

ATTORNEY

United States Patent Office 3,477,749
Patented Nov. 11, 1969

3,477,749
PIPE FITTING HAVING MECHANICAL FASTENER
FOR CONNECTING THE FITTING TO A PIPE
Henry H. Albro, Louisville, Ky., assignor to Cabot Corporation, Boston, Mass., a corporation of Delaware
Filed June 13, 1968, Ser. No. 736,718
Int. Cl. F16l 19/08
U.S. Cl. 285—340                                       3 Claims

ABSTRACT OF THE DISCLOSURE

A socket-type pipe fitting has permanently attached thereto an apertured deformable fastener through which the pipe end is moved in one direction during assembly of a pipe connection, but with the fastener resisting movement of the pipe end in the opposite direction. Coacting jaws of the fastener are located externally of the pipe fitting for ready manipulation when the pipe connection is to be disassembled.

Background of the invention

In many installations in which pipe fittings are connected to pipe it is desirable to have a connection which can be readily disassembled and which can be easily assembled without requiring special tools or the fastening of the pipe to the fitting with bolts, threads, bonding or the like. Various proposals for meeting this requirement have been made such as, for example, the wedge ring of the Leadbetter Patent 2,831,711 or the contractible sleeve of the Courtot Patent 2,813,730, but, so far as I am aware, all such proposals has involved certain disadvantages and which it is a purpose of this invention to overcome. As contrasted with the present fitting which can be inexpensively manufactured with the fastener in place, many of the prior art arrangements require special machining of the fitting or specially prepared molds with commensurate increase in cost of the product.

Summary of the invention

The invention embodies a combination of a fastener with any of a variety of types of conventional pipe fittings and so arranged that a circular pipe end can be readily inserted into the fitting and with the fastener resisting withdrawal of the pipe from the fitting. The fastener includes legs embedded in the end face of the fitting and jaws between such legs adapted to engage the pipe. Among the advantages of the invention are the provision of an inexpensive fastener which is reliable in operation, which provides for easy assembly or disassembly of a pipe connected to a fitting; which does not necessitate any major change in the technique of manufacturing of the fitting; and wherein the fitting equipped with the fastener and the pipe itself can be reassembled and reused after once having been disassembled.

The above-mentioned and other features and objects of the invention and the manner of attaining them will become more apparent and the invention itself will be best understood by reference to the following description of an embodiment of the invention taken in conjunction with the following drawings wherein.

Figure 4:
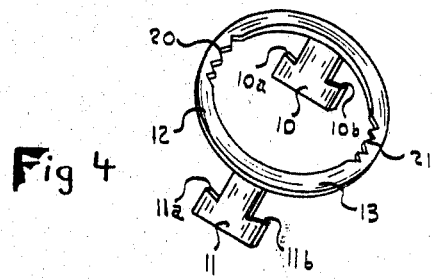
FIG. 4 is a perspective view of the fastener before being embedded in the pipe fitting.

Referring first to FIG. 4, a preferred form of fastener comprises an annular plate of a suitable metal which, for example, may be of stainless or spring steel about 1/16 inch thick and having a plurality of legs 10, 11 here shown as two, projecting normally to the plane of the plate prior to deformation of such plate, and permanently affixed to that plate. Preferably, the legs are of arcuate cross section in planes parallel to the plate and with a curvature corresponding generally to the curvature of the face of the pipe fitting into which they are to be embedded. These legs are formed so as to resist withdrawal from the fitting and may be shaped with barb portions 10a, 10b and 11a, 11b extending toward the plate.

More than two such legs may be employed, but it is to be understood that the legs are spaced at substantially equal circumferential intervals around the plate so that the jaw portions 12 and 13 of the plate will take substantially equal bites upon the pipe as later to be described.

The pipe fitting which is equipped with a socket portion 15 has a fluid passageway 16 therethrough and may comprise any conventional fitting such as a T, valve, elbow, coupling, adaptor, cap, bushing, union or the like and may employ the described fastener at one or more of the fitting ends. Preferably a conventional O-ring seal 17 is housed within the socket space and as will be apparent the positions of the legs of the fastener are so located as to avoid interference with the groove for the seal or the seal therein. The fitting body may be formed of any suitable material and the invention is particularly well suited for use with molded plastic pipe fittings and with plastic pipe, although it is not limited to such materials. In general, as long as the fastener comprises a relatively hard material with respect to the material of the pipe the particular choice of materials for the respective elements is unimportant.

Figure 1:
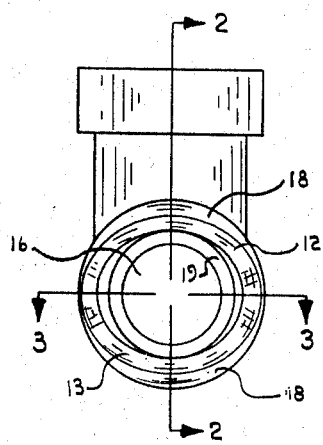
FIG. 1 is an end view of one form of pipe fitting, shown as an elbow, and illustrating the opening of the fastener confronting the pipe end.
Figure 2:
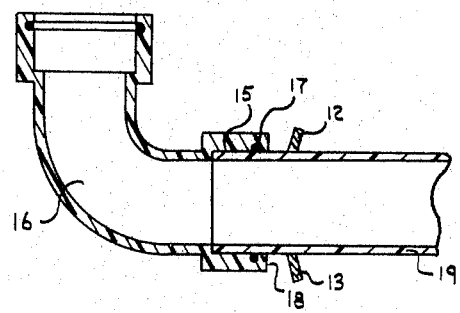
FIG. 2 is a sectional view taken on line 2—2 of FIG. 1 and with the pipe end in fastened position within the fitting.
Figure 3:
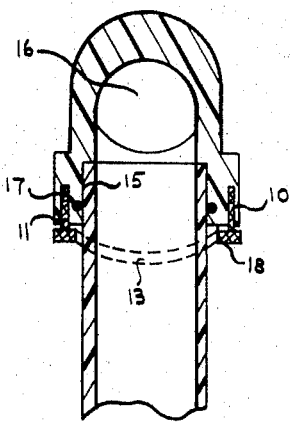
FIG. 3 is a view, similar to FIG. 2, but taken on line 3—3 of FIG. 1.

The fitting body has an end wall 18 with an annular face which is normal to the axis of pipe 19 and surrounding that pipe. Upon embedding the fastener in this face and which may be done at the time of molding of the pipe fitting, care is exercised to assure that the plane of the then undeformed plate is parallel to the plane of the annular face of that end wall. With the fitting thus equipped with the fastener, the thin plate is then deformed by outward pull upon the jaws 12, 13 until such jaws adopt a permanent set at equal distances from the end wall 18, as best seen in FIG. 2. At this time the opening presented to the pipe end during assembly of the installation will be non-circular as best seen in FIG. 1, and with the distance between the cooperating jaws being less than the outer diameter of pipe 19.

In order to enhance the grip of the fastener upon the pipe so as to resist both rotation of the pipe around its axis and translation of the same away from the fitting, suitable teeth as indicated at 20, 21 are formed in the inner edges of the jaw portions.

Accordingly, in making the connection between the pipe and fitting, all that is required is to insert the pipe end into the opening within the fastener and push the pipe until its end reaches the desired position within the socket. During this assembly the jaws 12 and 13 are sprung outwardly and stressed and the O-ring seal is compressed. Should the pipe thereafter tend to move outwardly from the socket under pressure of fluid, expansion of pipe material, or for other reasons the jaws bite into the surface of the pipe and prevent such outward movement. However, if the connection is to be intentionally disassembled, all that is required is to press upon jaws 12, 13 and force the same toward the adjacent face of the fitting to enlarge the opening of the fastener, whereupon the pipe can be moved easily from the socket.

Although in most cases a fastener having two legs and two jaws will suffice, it will be understood that a greater number of such legs and jaws may be employed without departing from the invention. When more legs are employed, the greater will be the attachment of the fastener to the fitting and correspondingly the resulting greater number of jaws will provide a greater bite upon the pipe. Whereas the non-circular opening of the fastener when two legs are employed presents a generally oval confrontation to the pipe, the use of three or more legs will present a scalloped confrontation of opening.

In addition to the advantage of easy assembly and disassembly of the parts, the invention also permits the reuse of the same fitting and the same pipe after having once been disassembled.

While there have been discussed above the principles of the invention with respect to a specific form, it is to be understood that this description is made by way of example and not as a limitation of the scope of the invention.

What is claimed is:

1. In a socket-type pipe fitting adapted to receive a circular pipe end and to form a connection therewith, said fitting comprising a tubular body with at least one end wall including an internal socket communicating with the corresponding end of a fluid passageway within the fitting and with an outer annular face normal to the axis of the pipe, a one-piece mechanical fastener having elongated leg portions substantially completely embedded in said one end wall at substantially equally spaced intervals in said outer face of the body and extending generally parallel to the axis of the said pipe, said legs include barbs facing toward said outer annular face of said body and enhancing the resistance of said legs against withdrawal from said body, said fastener including a resilient, thin, deformable annular plate attached to said legs and with an opening sufficient to receive the outer diameter of the pipe, the portions of said plate between adjacent legs forming jaws and presenting said opening in a non-circular confrontation to said pipe and with the distance between cooperating jaws prior to entry of the pipe into said opening being less than the outer diameter of the pipe whereby upon inserting the pipe into said opening said jaws move outwardly to permit the pipe to enter the socket and upon reverse movement of the pipe said jaws bite into the outer surface of the pipe and resist withdrawal of the pipe from the fitting.

2. A fitting as defined in claim 1 wherein said jaws engage said pipe at substantially correspondingly equal distances from said outer face of said body after said pipe is connected to said fitting.

3. A fitting as defined in claim 1 wherein said legs have an arcuate cross section in planes parallel to the plane of said outer face of said body, said arcuate sections having radii intermediate the radii of the inner and outer surfaces of said body.

References Cited

UNITED STATES PATENTS

| 2,125,477 | 8/1938 | Whitney. | |
| 2,286,991 | 6/1942 | MacFadden. | |
| 2,388,650 | 11/1945 | Whittell et al. | |
| 3,019,284 | 1/1962 | Matthysse | 285—340 X |
| 3,058,762 | 10/1962 | Howe | 285—340 X |
| 3,312,483 | 4/1967 | Leadbetter et al. | 285—423 X |

FOREIGN PATENTS

| 498,350 | 12/1953 | Canada. |
| 606,054 | 8/1948 | Great Britain. |

THOMAS F. CALLAGHAN, Primary Examiner

U.S. Cl. X.R.

285—179, 423